United States Patent [19]
Thayer et al.

[11] Patent Number: 5,554,912
[45] Date of Patent: Sep. 10, 1996

[54] ADAPTIVE INSTRUMENT DISPLAY BRIGHTNESS CONTROL SYSTEM

[75] Inventors: Peter A. Thayer, Indianapolis; Morgan D. Murphy, Kokomo, both of Ind.

[73] Assignee: Delco Electronics Corporation, Kokomo, Ind.

[21] Appl. No.: 441,505

[22] Filed: May 15, 1995

[51] Int. Cl.$^6$ .................................................. H05B 37/00
[52] U.S. Cl. ........................ 315/157; 315/150; 307/10.8
[58] Field of Search .................................. 315/150, 157, 315/158; 250/205; 307/10.1, 10.8; 364/424.05

[56] References Cited

U.S. PATENT DOCUMENTS

| | | | |
|---|---|---|---|
| 3,539,987 | 7/1967 | Greene | 250/205 |
| 4,029,991 | 6/1977 | Schultz | 315/77 |
| 4,435,648 | 3/1984 | Goode | 307/10 R |

FOREIGN PATENT DOCUMENTS 111942  4/1994  Japan .

Primary Examiner—Robert Pascal
Assistant Examiner—David H. Vu
Attorney, Agent, or Firm—Jimmy L. Funke

[57] ABSTRACT

An adaptive instrument display brightness control system that automatically controls the instrument display brightness of a vehicle based on a vehicle operator's changes to the display brightness and particular ambient light conditions. An ambient light intensity sensor sends an ambient light intensity signal to a microprocessor which then selects a brightness look-up value from a look-up table based on the light intensity to illuminate the instrument display. If the vehicle operator adjusts the instrument display brightness, and the change to the brightness is within a learning range of the system, the microprocessor will set an adaptive timer to validate the change. After the timer has expired, the microprocessor will adjust the look-up value to a predetermined percent of the difference between the original look-up value and a new look-up value coinciding with the new illumination setting.

21 Claims, 3 Drawing Sheets

ADAPTIVE INSTRUMENT DISPLAY BRIGHTNESS CONTROL SYSTEM

CROSS REFERENCE TO RELATED APPLICATION

This application is related to U.S. patent application Ser. No. 08/344,189, filed Nov. 23, 1994, titled Adaptive Climate Control System; U.S. patent application Ser. No. 08/437,555, filed May 9, 1995, titled Adaptive System for Determining Volume Gain for Vehicle Audio Systems; U.S. patent application Ser. No. 08/441,109, filed May 15, 1995, titled Adaptive System for Determining Radio Frequency at Vehicle Start-Up; and U.S. patent application Ser. No. 08/441,107, filed May 15, 1995, titled System for Verifying Driver ID, all assigned to the assignee of this application.

BACKGROUND OF THE INVENTION

1. Field of the Invention

This invention relates generally to a brightness control system and, more particularly, to an adaptive instrument display brightness control system that automatically controls the illumination of a vehicle instrument display based on a vehicle operator's adjustment of the illumination intensity of the display and the ambient light condition.

2. Discussion of the Related Art

Current technology in the manufacture of vehicles includes advancements directed to personalization of certain vehicle systems to a particular vehicle operator. One particular personalization advancement is in an electronic climate control system as disclosed in U.S. patent application Ser. No. 08/344,189, filed Nov. 23, 1994, titled ADAPTIVE CLIMATE CONTROL SYSTEM, assigned to the assignee of the instant application, and herein incorporated by reference. This adaptive climate control system is an improvement on known electronic climate control (ECC) systems that automatically control the climate within the passenger compartment of a vehicle based on a number of parameters that affect the climate. These parameters are initially preprogrammed and calibrated to a particular comfort level by a climate control calibration engineer at the manufacturing level of the vehicle.

The adaptive ECC system allows adjustments to the control of the system by a particular vehicle operator to teach the system to automatically be set to the operator's comfort level. For example, if the vehicle operator adjusts the temperature set point of the ECC system at a particular ambient air temperature, the system will store this change for that ambient air temperature. Once the change has been validated, the next time the system encounters that ambient air temperature, or an ambient air temperature around that ambient air temperature, the system will automatically provide the appropriate air mixture as previously set by the vehicle operator. Further, the adaptive ECC system will adapt the blower speed to the preference of the vehicle operator. Each time the vehicle operator adjusts the blower speed to a particular value for a set of environmental conditions, and the adaptive system validates the change in blower speed, the system will automatically readjust the blower speed for subsequent similar environmental conditions sensed by the system.

The concept of adapting certain vehicle systems to a particular vehicle operator's preferences can be extended to other vehicle systems in addition to the vehicle climate control system. For example, another adaptive vehicle control system automatically adjusts the volume gain of a vehicle audio system in response to ambient noise such as changes in engine speed, climate control mode and blower speed in connection with a vehicle operator's adjustment of the audio system volume level as disclosed in U.S. patent application Ser. No. 08/437,555, filed May 9, 1995, titled ADAPTIVE SYSTEM FOR DETERMINING VOLUME GAIN FOR VEHICLE AUDIO SYSTEMS. Another adaptive system sets the radio frequency of a vehicle radio at vehicle start-up depending on the vehicle operator's preference at a particular time of day as disclosed in U.S. patent application Ser. No. 08/441,109, filed May 15, 1995, titled ADAPTIVE SYSTEM FOR DETERMINING RADIO FREQUENCY AT VEHICLE START-UP. Both of these applications are assigned to and are herein incorporated by reference. Still, other vehicle systems can benefit from these types of adaptive control systems.

Another system that can benefit from being adapted to a vehicle operator's preference is the brightness of the instrument display of the vehicle. All, or most all, vehicles incorporate some type of instrument display lighting so that the vehicle operator can easily view the vehicle's instruments in all ambient light conditions. Different types of instrument display illumination includes instrument backlighting, analog pointer lights, liquid crystal displays (LCDs) and vacuum florescent (VF) tubes. VF tubes are also used to provide the illumination intensity for head-up displays (HUDs) as is well known to one skilled in the art. Generally, the vehicle will include an illumination intensity switch that allows the vehicle operator to adjust the intensity of the instrument display or HUD as the operator desires.

Instrument display lighting creates heat relative to the intensity of the light. Continuous high intensity illumination of an instrument display will therefore reduce the reliability of the instruments because continued and excessive heat may affect their performance. In order to at least reduce the need to continually adjust the instrument display illumination and to limit the intensity of the instrument display illumination, it is advantageous to incorporate an adaptive illumination control system that automatically sets the instrument display illumination and is responsive to changes that a vehicle operator makes to the instrument display brightness control with respect to the ambient light conditions. Therefore, it is an object of the present invention to provide such an adaptive system.

SUMMARY OF THE INVENTION

In accordance with the teaching of the present invention, an adaptive instrument display brightness control system is disclosed that automatically controls the instrument display brightness based on the vehicle operator's changes to the display brightness at particular ambient light conditions. The adaptive brightness control system is originally calibrated to a particular brightness for a range of ambient light intensities. The system will select an instrument display brightness value from a brightness look-up table based on the ambient light intensity as sensed by a light sensor. If the vehicle operator adjusts the instrument display brightness, and the change to the brightness is within a learning range of the system, the system will set an adaptive timer to validate the change by the operator. Once the timer has expired, the system will adjust the look-up table at and around the particular ambient light intensity a predetermined percent of the difference between the original brightness setting and the new brightness setting. Maximum or minimum adjustments to the instrument brightness are not adapted by the system because they represent extreme situations.

DETAILED DESCRIPTION OF THE PREFERRED EMBODIMENTS

The following discussion of the preferred embodiments concerning an adaptive system for controlling instrument display illumination based on ambient light intensity is merely exemplary in nature, and is in no way intended to limit the invention or its application or uses. Specifically, the adaptive system discussed below is described as controlling the instrument display illumination associated with a vehicle and has particular use for the illumination of a head-up display. However, the system can be extended to other environments, such as video monitors, where ambient light intensity affects the ability of an operator to view characters that are illuminated.

Figure 1:
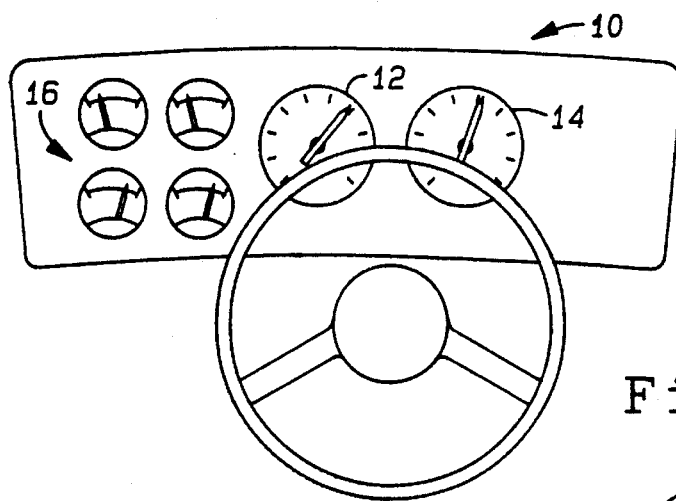
FIG. 1 is a diagrammatic front view of an instrument display of a vehicle.

FIG. 1 is a diagrammatic view of an instrument display panel 10 of a vehicle (not shown). The instrument panel 10 includes usual instrument displays such as a speed display 12 and an RPM display 14. The instrument panel 10 includes other types of displays 16, including displays for fuel level, battery charge, oil pressure, etc. The instrument panel 10 is also intended to represent an HUD of the type well known to those skilled in the art. It is stressed, however, that the instrument panel 10 is meant to be a general depiction of an instrument panel that is illuminated by any known illumination method, and therefore could include many other types of instrument displays, as well as a vehicle radio display.

Figure 2:
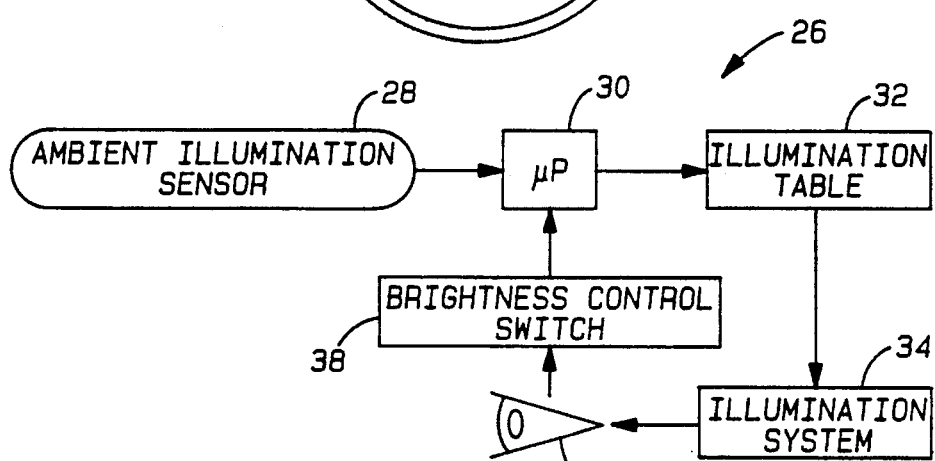
FIG. 2 is a diagrammatic block diagram depicting the manner in which instrument display brightness is adjusted according to an embodiment of the present invention.

FIG. 2 is an overview of a system 26 that adapts instrument display brightness to a vehicle operator's preference according to an embodiment of the present invention. It will be understood that the adaptive brightness control system according to the invention is applicable to any vehicle instrument display brightness system, including, but not limited to illumination by backlighting, VF tubes, LCD's, as well as the illumination of HUDs. The system 26 includes an ambient illumination sensor 28 that measures the ambient light intensity within the passenger compartment of the vehicle. The ambient sensor 28 can be any applicable light sensor, such as a photocell, that measures light intensity, and is effective for the purposes described herein. A voltage signal from the light sensor 28 indicative of the ambient light intensity is applied to a microprocessor 30. The microprocessor 30 uses the voltage signal from the light sensor 28 to determine an appropriate brightness value from an illumination look-up table 32 that will set the illumination intensity of the instrument display panel 10. The look-up table 32 can be in memory within the microprocessor 30. The look-up table 32 includes a series of data points, where each data point represents a range of ambient light intensity signals from the sensor 28 and a corresponding output illumination value. The applicable look-up value in the look-up table 32 is determined by interpolating the voltage representation of the ambient light intensity across the table data points.

The appropriate look-up value is sent to an illumination system 34 that controls the illumination of the instrument display panel 10. The illumination system 34 can be any applicable illumination system known in the art used to illuminate instrument displays of a vehicle that is appropriate for the purposes described herein. The instrument display brightness is observed by a vehicle operator 36 who then may adjust an instrument display brightness control switch 38 to a more desirable brightness level. The microprocessor 30 is responsive to a change of the switch 38 that adjusts the instrument display brightness. The microprocessor 30 will adjust the look-up table value a proportional amount based on the position of the switch 38 at the current ambient light intensity. As will be discussed in greater detail below, the microprocessor 30 may store a new look-up table value in the look-up table 32 based on the ambient intensity from the sensor 28 and the setting of the switch 38 so that the next time the sensor 28 indicates the same, or nearly the same light intensity, the look-up table brightness value will be set to the operator's preference. In this manner, the system 26 adapts the instrument display brightness over time within the range of ambient light intensities sensed by the sensor 28 to the brightness level desired by the vehicle operator. U.S. patent application Ser. No. 08/441,107, filed May 15, 1995, titled SYSTEM FOR VERIFYING DRIVER ID, assigned to the assignee of the instant application and herein incorporated by reference, discloses a system by which an adaptive system of the type being described herein can separately identify a plurality of vehicle operators so as to be able to adapt the instrument display brightness independently for the preferences of each of the different vehicle operators.

Figure 3:
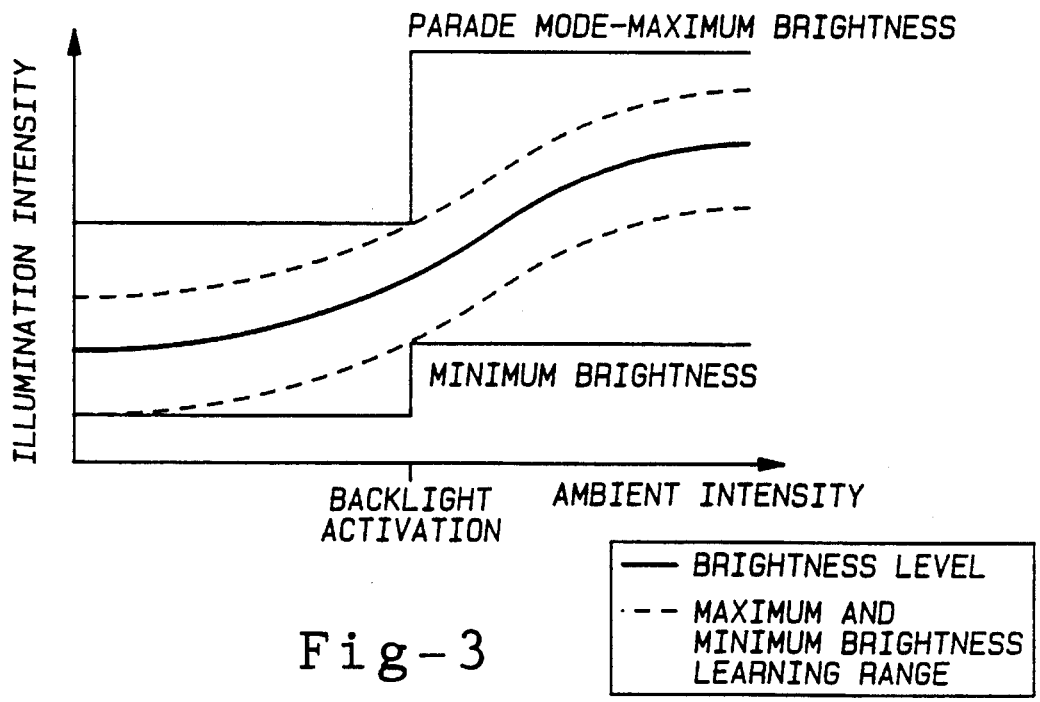
FIG. 3 is a graph showing the brightness level of the instrument display based on ambient illumination intensity on the horizontal axis and instrument illumination intensity on the vertical axis.

FIG. 3 shows a graph of the changing brightness level of the instrument display with respect to the ambient light intensity. The horizontal axis of the graph shows the ambient light intensity increasing towards the right, and the vertical axis of the graph shows the instrument display illumination intensity increasing in a vertical direction. A parade mode maximum brightness line represents the maximum brightness achievable at any given ambient light intensity. The parade mode is usually a maximum brightness detent location of the switch 38 when the headlights of the vehicle will be on, and all of the instrument display illumination will be at a maximum brightness, but the backlighting will be switched off. For those vehicles that do not have a parade mode switch location, the maximum brightness line represents the maximum brightness of all the instrument display lights. A minimum brightness line is the minimum instrument intensity for any given ambient light intensity that can be set by the switch 38. The backlight activation location for both the maximum brightness and minimum brightness lines represents the ambient light intensity that instrument backlighting will be switched on or off when the ambient light intensity reaches this value. This value does not affect the other instrument display illumination sources, such as the VF tubes and LCDs, as well as the illumination intensity of a HUD.

A center brightness control line of the graph of FIG. 3 represents the look-up table values of the calibrated intensity of the instrument display brightness as determined at the manufacturing level of the vehicle. To set this brightness control level, in one example, a minimum cross-section of vehicle operator's is used to determine at what level the instrument display brightness is the best for the range of ambient intensities. Once these values are calibrated into the look-up table 32, the ultimate vehicle operator for a particular vehicle can then adapt the system 26 to other brightness levels depending on that operator's preference. In the embodiment being discussed, the instrument display brightness can only be adjusted between the two dotted lines that substantially follow the shape of the center brightness level line for the system 26 to adapt to changes. This range of brightness at a particular ambient intensity represents about 80% of the travel of the switch 38. Those brightness intensities between the dotted line and the maximum or minimum brightness lines are extreme situations where the system does not adapt. In this example, the distance between the top dotted line and the maximum brightness line is about the top 10% of the travel of the switch 38, and the distance between the bottom dotted line and the minimum brightness line represents the lowest 10% of the travel of the switch 38. Of course, the range of the travel of the switch 38 in which adaptations occur can be adjusted according to different specific applications. For example, the entire travel of the switch 38 can be adapted, or less than 50% of the travel of the switch 38 can be adapted. It is within the scope of the present invention that any percentage of the travel of the switch 38 can be adapted for a specific application. Further, a switch (not shown) can be provided that allows the vehicle operator 36 to determine what percentage of the travel the switch 38 will be adapted.

Figure 4:
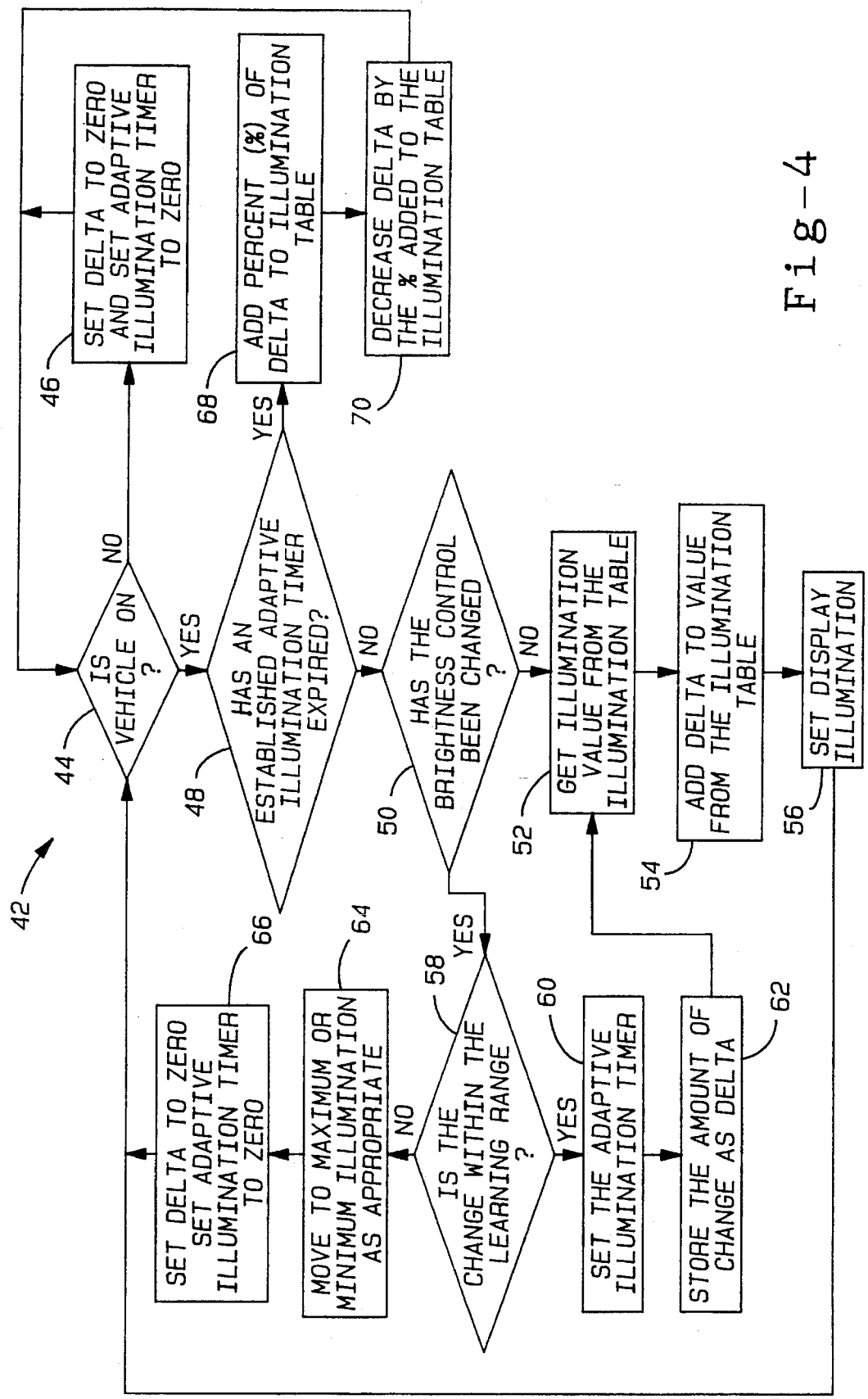
FIG. 4 is a flow chart type diagram depicting how an adaptive instrument display brightness control system according to an embodiment of the present invention adjusts the instrument display brightness based on an operator's preference.

FIG. 4 shows a flow chart diagram 42 depicting how the system 26 resets the instrument display brightness based on the operator's preference. The process being described for adapting the instrument display brightness is event sensitive in that certain events cause the system 26 to react. One of those events is to periodically determine if the vehicle is on. A box 44 represents a place in the loop of the system 26 where the system 26 determines if the vehicle is running. If the vehicle is not running, the system 26 will set an adaptive illumination timer and a system delta to zero as represented by box 46. The adaptive illumination timer is a timer that is set when a change to the instrument display brightness control switch 38 has been made by the vehicle operator 36, as will be discussed below, in order to validate the change. Determining if the brightness control switch 38 has been adjusted is another event that the system 26 periodically looks for. In one embodiment, the adaptive timer will be five minutes. Of course, other time settings for the adaptive timer can be used within the scope of the present invention. For example, the adaptive timer can be any time value between one and sixty minutes. Further, a switch (not shown) can be provided that allows the vehicle operator 36 to set the time interval of the adaptive timer. Delta is the represented difference between the original setting of the switch 38 and the position of the switch 38 after it has been adjusted. While the vehicle is in an off state, the system 26 will continue to periodically determine if the vehicle is on and initialize these values to zero.

If the system 26 determines that the vehicle is on, the system 26 will then determine if the adaptive illumination timer has expired as represented by box 48. Determining if the illumination timer has expired is another event that the system 26 periodically determines. If the system 26 determines that the illumination timer has not expired, the system 26 will then periodically determine if the operator 36 has adjusted the brightness control switch 38 as indicated by box 50. If the switch 38 has not been adjusted by the vehicle operator 36, the system 26 will get the appropriate illumination value from the look-up table 32 at the present ambient light intensity as represented by box 52. Once the system 26 has gotten the appropriate look-up value, the system 26 will add delta to this value to determine the appropriate instrumentation display intensity as represented by box 54. At this time, since the vehicle operator 36 has not adjusted the switch 38, the delta should be zero as set by the step of box 46 above. Therefore, the system 26 will set the instrument display intensity consistent with the look-up table value as represented by box 56. The system 26 will then continue to determine if the vehicle is on or off at the box 44.

If the system 26 determines that the brightness control has been changed at the box 50, the system 26 will then determine if this change is within the system learning range, as discussed above, as represented by box 58. If the change to the brightness control switch 38 is within the learning range of the system 26, the system 26 will then set the adaptive illumination timer as represented by box 60. Next, the system 26 will store the amount of change of the brightness control switch 38 as delta for the current ambient intensity as represented by box 62. Once the system 26 has stored delta, the system 26 will then get the appropriate illumination value from the look-up table 32 for this ambient intensity at the box 52, and set the appropriate instrument display illumination adjusted by a non-zero delta at the box 56 in the manner as discussed above.

If the change in the instrument intensity is outside of the learning range at the box 58, the system 26 will then move the instrument display intensity to either the maximum or minimum intensity value depending on which way the operator 36 adjusted the switch 38 as represented by box 64. Once the instrument display intensity has been adjusted to maximum or minimum, the system 26 will again set delta and the adaptive illumination timer to zero as represented at box 66. The system 26 will then determine if the vehicle is on or off at the box 44.

After the operator 36 has changed the brightness control setting of the switch 38, and the system 26 has set the adaptive timer and adjusted the instrument display illumination accordingly, as discussed above, the system 26 will eventually determine that the adaptive illumination timer has expired at the box 48. If the operator 36 changes the switch 38 before the adaptive timer has expired from a previous change, the system 26 will discard the old change in favor of the new switch position, and will reset the adaptive timer. If the adaptive illumination timer has expired, and the operator 36 has not adjusted the switch 38, the system 26 will add a percentage of delta to the illumination look-up table 32 at box 68. In one embodiment, this percentage is 25% of the difference between the original position of the switch 38 and the new position of the switch 38. In this embodiment, only a percentage of delta is added to the illumination look-up table based on the premise that people generally overstate their desires, and thus, the vehicle operator 36 would more than likely have adjusted the brightness control more than what he really wanted to. The percentage of delta discussed above is used by way of a non-limiting example. Any other percentage of delta, for example between 10% and 100% of delta, can be implemented for a specific application within the scope of the present invention. Further, a switch (not shown) can be incorporated to allow the vehicle operator 36 to adjust the percentage of delta according to his preferences.

Further, a percentage of delta is added to the look-up table values that are around the target look-up table value for the current ambient light intensity in the manner that the taper fields were adjusted in the ADAPTIVE CLIMATE CONTROL SYSTEM of U.S. patent application Ser. No. 08/344,189, discussed above. After the percent of delta is added to the illumination table, the delta is decreased by this percent and the new delta is stored at box 70. Once the new delta is stored, the system 26 then determines if the vehicle is on at the box 44. When the delta has been decreased by the percentage that is added to the look-up table, and the vehicle remains on, then this value is added to the illumination value at the box 54 to obtain the illumination setting, as discussed above. However, no further adaptations are made to the look-up table 32 for the particular switch setting at this ambient intensity until the vehicle has been turned off (when the delta is set to zero).

Figure 5:
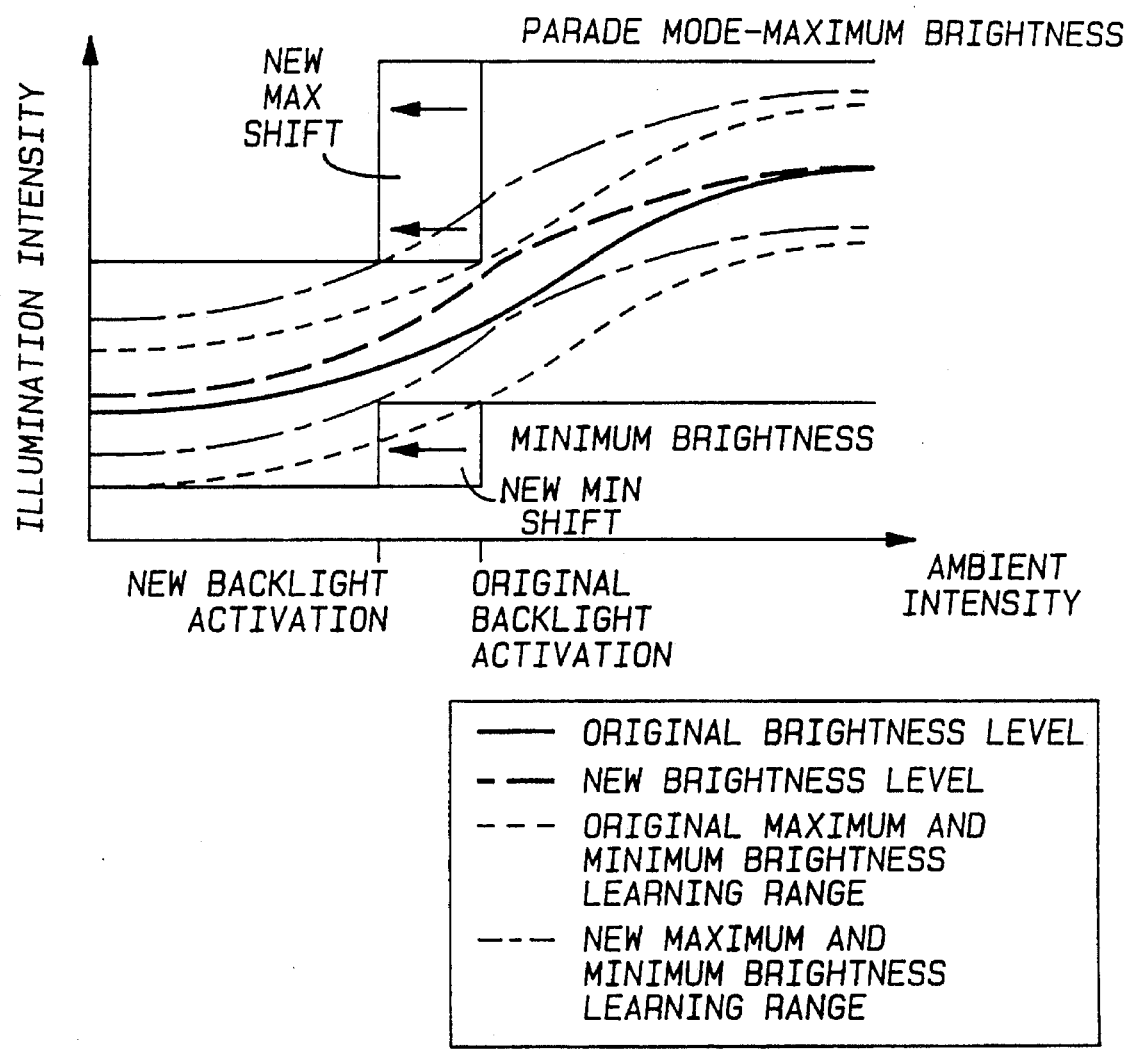
FIG. 5 is a graph showing a vehicle operator's adaptations to the instrument display brightness of the graph of FIG. 2.

FIG. 5 is a graph similar to that of FIG. 3, but showing the graph as it would appear after one or more adaptations have been validated. In this graph, the vehicle operator 36 has made adaptations to the instrument display brightness that increases the brightness over the entire range of ambient light intensities. Therefore, at any particular ambient light intensity as sensed by the sensor 28 discussed above, the new adaptations will give an increased instrument display brightness than would have previously been given at the original calibrated brightness levels. When the center brightness line gets adapted to a new value, the learning range is also adjusted, as shown. Further, the system 26 adapts to different points where the backlight illumination will be activated. This backlight activation line is determined by the adapted maximum and minimum range as shown.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

The embodiments of the invention in which an exclusive property or privilege is claimed are defined as follows:

1. A system for adjusting an illumination intensity, said system comprising:

sensing means for sensing ambient light intensity;

illumination means for providing illumination;

switch means for adjusting the intensity of the illumination means; and control means for controlling the illumination intensity of the illumination means, said control means being responsive to a signal from the sensing means and a signal from the switch means, said control means adjusting the illumination intensity of the illumination means over a range of sensed ambient light intensities based on a combination of the ambient light intensity and the position of the switch means, wherein the control means automatically provides an illumination intensity signal to the illumination means to set a first illumination intensity at a particular ambient light intensity based on the ambient light intensity, and automatically provides a second illumination intensity signal to the illumination means to set a second illumination intensity at the particular ambient light intensity based on an adjusted position of the switch means, said control means storing illumination data indicative of the second illumination intensity so as to set the illumination intensity of the illumination means for a subsequently sensed ambient light intensity that is the same as the particular ambient light intensity.

2. The system according to claim 1 further comprising a look-up table, said look-up table storing the illumination data as a series of look-up values that represent a range of illumination intensities of the illumination means, said control means adjusting the look-up values based on an adjusted position of the switch means and the ambient light intensity.

3. The system according to claim 2 wherein the control means adjusts the look-up table values to a percentage of the difference between an original position of the switch means and the adjusted position of the switch means.

4. The system according to claim 1 wherein the control means includes an adaptive timer, said control means setting the adaptive timer in response to a change in the position of the switch means, said control means adjusting a target illumination value after the adaptive timer has expired, said target value being stored by the control means.

5. The system according to claim 4 wherein the control means adjusts a predetermined number of the illumination values around the target illumination value to a percentage of the difference between an original position of the switch means and an adjusted position of the switch means.

6. The system according to claim 1 wherein the control means determines if a change in position of the switch means is within a predetermined learning range of the control means, said control means setting a maximum or minimum illumination intensity if the change is not within the learning range.

7. The system according to claim 6 wherein the learning range is 80% of the range of the switch means.

8. The system according to claim 1 wherein the illumination means is an illumination device that illuminates an instrument display of a vehicle.

9. The system according to claim 1 wherein the control means includes a microprocessor.

10. A system for automatically adjusting a display brightness of an instrument display of a vehicle based on ambient light intensity, said system comprising:

a light sensor, said light sensor determining the ambient light intensity and providing a signal indicative of the ambient light intensity;

an illumination source, said illumination source illuminating the display;

a variable intensity switch, said variable intensity operable to vary the intensity of the illumination source; and a control device being responsive to the signal from the light sensor and providing a signal to the illumination source that will set an intensity level of the illumination source dependent on the signal from the light sensor, wherein the intensity level is based on illumination values stored in the control device, said illumination values being changed to adjusted illumination values in response to an adjustment of the intensity of the illumination source by the variable intensity switch.

11. The system according to claim 10 wherein the control device adjusts the illumination values to a predetermined percentage of the difference between an original position of the intensity switch and an adjusted position of the intensity switch.

12. The system according to claim 10 wherein the control device determines if a change in the position of the switch is within a predetermined learning range of the control device, said control device setting a maximum or minimum illumination intensity if the change is not within the learning range.

13. A system for automatically adjusting the illumination of a vehicle instrument display, said system comprising:

a sensing device that senses ambient light intensity, said sensing device providing a signal indicative of the ambient light intensity;

an illumination device for illuminating the instrument display;

a variable intensity switch that adjusts the intensity of the illumination device; and a control device that controls the illumination intensity of the illumination device, said control device being responsive to the signal from the sensing device and the signal from the switch, said control device including an illumination table that stores a series of illumination values where each illumination value in the illumination table represents an illumination intensity of the illumination device, said control device using a target illumination value from the illumination table to set the intensity of the illumination device based on the signal from the sensing device at a particular ambient light intensity, said control device adjusting the target illumination value to provide an adjusted target illumination value for the particular ambient light intensity based on an adjusted position of the intensity switch and the ambient light intensity, and said control device using the adjusted target illumination value to set the intensity of the illumination device based on the signal from the sensing device for subsequent ambient light intensities at the particular ambient light level.

14. The system according to claim 13 wherein the control device includes an adaptive timer, said control device setting the adaptive timer in response to a change in the position of the switch, said control device adjusting the target illumination value after the adaptive timer has expired, said target illumination value representing the value of a current ambient light intensity.

15. The system according to claim 14 wherein the control device adjusts the target illumination value to a percentage of the difference between an original position of the switch device and an adjusted position of the switch device after the timer has expired.

16. The system according to claim 14 wherein the control device adjusts a predetermined number of the illumination values around the target illumination value to a percentage of the difference between an original position of the switch device and an adjusted position of the switch device.

17. The system according to claim 13 wherein the control device determines if a change in the position of the switch device is within a predetermined learning range of the control device, said control device setting a maximum or minimum illumination intensity if the change is not within the learning range.

18. A method of adjusting an illumination intensity, said method comprising the steps of:

sensing ambient light intensity;

providing illumination at a predetermined intensity; and controlling the intensity of the illumination, said step of controlling the illumination intensity including automatically setting a first illumination intensity at a particular ambient light intensity based on the ambient light intensity, and automatically setting the illumination intensity to a second illumination intensity at the particular ambient light intensity based on an adjusted position of a switch for adjusting the illumination intensity, wherein the step of controlling the intensity of the illumination includes storing illumination data indicative of the second illumination intensity so as to set the illumination intensity for a subsequently sensed ambient light intensity that is the same as the particular ambient light intensity.

19. The method according to claim 18 wherein the steps of controlling the illumination intensity includes selecting an illumination intensity value from a table of illumination intensity values based on the ambient light intensity, and adjusting the table of illumination intensity values in response to a change in the position of the switch at the particular ambient light intensity.

20. The method according to claim 18 further comprising the step of setting an adaptive timer in response to a change in the position of the switch and adjusting a target illumination value after the adaptive timer has expired, said target value being stored illumination data.

21. The method according to claim 20 wherein the step of adjusting the target illumination value includes adjusting a predetermined number of the illumination values around the target illumination value to a percentage of the difference between an original position of the switch and an adjusted position of the switch.

* * * * *